(No Model.)

G. C. FISK.
ANTI-INCRUSTATION ATTACHMENT FOR BOILERS.

No. 285,248. Patented Sept. 18, 1883.

Attest.
Edward P. Follett
R. E. White

Inventor.
Geo. C. Fisk,
per R. F. Osgood,
atty.

UNITED STATES PATENT OFFICE.

GEORGE C. FISK, OF DANSVILLE, NEW YORK.

ANTI-INCRUSTATION ATTACHMENT FOR BOILERS.

SPECIFICATION forming part of Letters Patent No. 285,248, dated September 18, 1883.

Application filed October 24, 1881. (No model.)

*To all whom it may concern:*

Be it known that I, GEORGE C. FISK, of Dansville, Livingston county, New York, have invented a certain new and useful Improvement in Anti-Incrustation Attachments for Boilers; and I do hereby declare that the following is a full, clear, and exact description of the same, reference being had to the accompanying drawings, in which—

Figure 1:
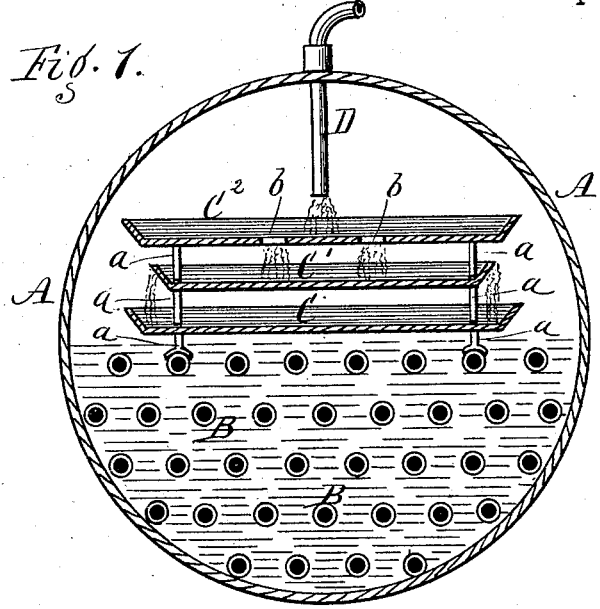
Figure 2:
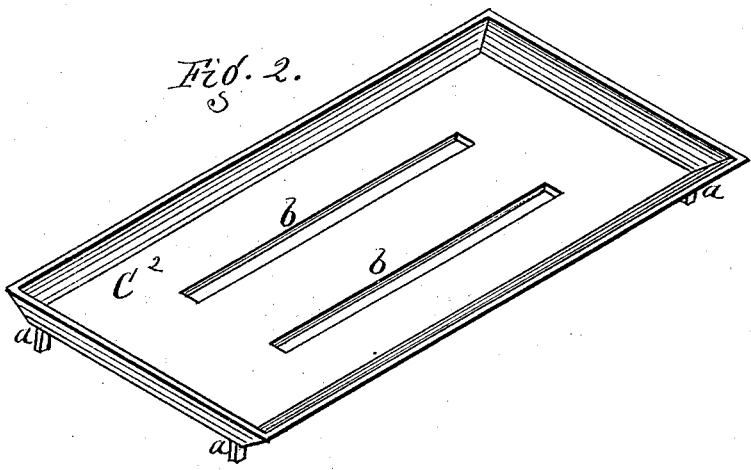

Figure 1 is a cross-section of a boiler, showing my improvement applied thereto. Fig. 2 is a perspective view of the upper removable pan, which is placed in the boiler.

My improvement relates to devices for preventing the incrustation of boilers; and it consists in the employment of a series of water-pans of peculiar construction, placed loosely in the boiler on the flues, resting one above another, and receiving the feed-water through a suitable pipe, as hereinafter more fully described.

In the drawings, A represents a boiler, which is shown in cross-section, and B B represent the ordinary flue-pipes.

C C' C² represent a series of very shallow pans, made preferably of sheet metal—such as galvanized iron or tin—with flaring sides. The lower pan rests on legs $a$ on top of the boiler-flues. The other pans also have short legs $a$ $a$, which stand loosely in the pans below, and they are thus removable separately, being inserted and taken out through the man-hole of the boiler. The upper and lower pans are of large size, and the middle one of small size, comparatively, and the upper one has two longitudinal slots $b$ $b$, opening through it, while the two lower ones are imperforated, as shown.

D is the ordinary feed-water pipe, which passes through the top of the boiler and rests over the central portion of the upper pan, between the two slots. If desired, more than three of the pans may be employed, the same general arrangement being followed—i. e., the upper pan being slotted, and every intermediate pan being of smaller diameter than the alternate ones.

The operation is as follows: The feed-water dropping from the pipe is spread over the bottom of the upper pan, but without filling it, as the water passes at once through the slots to the second pan. The thin sheet of water in this first pan allows the great mass of scale contained in the water to be deposited on this pan alone, which gathers more particularly in the center between the slots and in the edges of the slots, and is therefore more readily removed than where it spreads evenly over a very large surface. The water then fills the second pan, and from this it runs over the edges and falls into the third pan and fills it, and finally escapes into the boiler. In passing the several pans the water also runs over the bottoms in a thin sheet, and more or less of the scale is deposited over the whole surface of the pans. From the peculiar construction of the upper pan, however, as before described, whereby the water simply runs in a thin sheet over the whole surface and does not gather in a body, the great deposit of the scale is on the upper pan, where it may be readily removed by removing the pan, without disturbing the other pans; or all may be removed at the same time where there is sufficient deposit.

I am aware that many forms of apparatus for the deposit of scale are well known, and I make no claim to advantages other than that of removable pans resting one above another, and the use of an upper pan having a slotted bottom, by which the water is spread in a thin sheet and discharged centrally, as before described.

Having thus described my invention, what I claim as new is—

In combination with the boiler and its flues, the series of horizontal removable pans C C' C², the pan C being supported on the flues, the intermediate pan, C', being smaller than the pan C and supported thereby, the double-slotted pan C² supported on pan C', and the feed-water pipe passing through the boiler-shell and arranged to deliver between the slots of the pan C², substantially as set forth.

In witness whereof I have hereunto signed my name in the presence of two subscribing witnesses.

GEO. C. FISK.

Witnesses:
A. H. KNAPP,
JOHN P. EMBSER.